United States Patent
Yao et al.

(10) Patent No.: US 11,208,562 B2
(45) Date of Patent: Dec. 28, 2021

(54) ZIRCONIUM OXIDE NANOPARTICLES

(71) Applicant: NIPPON SHOKUBAI CO., LTD., Osaka (JP)

(72) Inventors: Tomoyuki Yao, Osaka (JP); Takeo Akatsuka, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/086,780

(22) PCT Filed: Jan. 30, 2017

(86) PCT No.: PCT/JP2017/003168
§ 371 (c)(1),
(2) Date: Sep. 20, 2018

(87) PCT Pub. No.: WO2017/163610
PCT Pub. Date: Sep. 28, 2017

(65) Prior Publication Data
US 2019/0048201 A1 Feb. 14, 2019

(30) Foreign Application Priority Data

Mar. 25, 2016 (JP) .............................. JP2016-061941
Jul. 19, 2016 (JP) .............................. JP2016-141696

(51) Int. Cl.
| | |
|---|---|
| C09C 3/08 | (2006.01) |
| C09C 1/00 | (2006.01) |
| C04B 35/48 | (2006.01) |
| C04B 35/64 | (2006.01) |
| C08K 3/22 | (2006.01) |
| C08K 9/04 | (2006.01) |
| C01G 25/02 | (2006.01) |
| C04B 35/628 | (2006.01) |
| C04B 35/486 | (2006.01) |
| B82Y 30/00 | (2011.01) |
| B82Y 40/00 | (2011.01) |

(52) U.S. Cl.
CPC ............... *C09C 3/08* (2013.01); *C01G 25/02* (2013.01); *C04B 35/48* (2013.01); *C04B 35/486* (2013.01); *C04B 35/62886* (2013.01); *C04B 35/64* (2013.01); *C08K 3/22* (2013.01); *C08K 9/04* (2013.01); *C09C 1/00* (2013.01); *B82Y 30/00* (2013.01); *B82Y 40/00* (2013.01); *C01P 2002/50* (2013.01); *C01P 2002/60* (2013.01); *C01P 2002/76* (2013.01); *C01P 2002/88* (2013.01); *C01P 2004/64* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3246* (2013.01); *C04B 2235/449* (2013.01); *C04B 2235/528* (2013.01); *C04B 2235/5276* (2013.01); *C04B 2235/5292* (2013.01); *C04B 2235/5454* (2013.01); *C04B 2235/781* (2013.01); *C08K 2003/2244* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 4,159,204 A | 6/1979 | Dittrich et al. | |
| 4,778,671 A | 10/1988 | Wusirika | |
| 6,376,590 B2 * | 4/2002 | Kolb .................... | B01J 13/0008 106/287.19 |
| 6,387,981 B1 | 5/2002 | Zhang et al. | |

(Continued)

FOREIGN PATENT DOCUMENTS

| | | |
|---|---|---|
| EP | 0 366 934 | 5/1990 |
| EP | 1 720 075 | 1/2006 |

(Continued)

OTHER PUBLICATIONS

International Search Report dated Feb. 28, 2017 in International (PCT) Application No. PCT/JP2017/003168.

(Continued)

*Primary Examiner* — Ronak C Patel

(74) *Attorney, Agent, or Firm* — Wenderoth, Lind & Ponack, L.L.P.

(57) ABSTRACT

An object of the present invention is to provide zirconium oxide nanoparticles that have excellent dispersibility in a polar solvent and are capable of increasing a core concentration in a dispersion liquid. Zirconium oxide nanoparticles according to the present invention are coated with at least one compound selected from the group consisting of $R^1$—COOH, $(R^1O)_{3-n}$—P(O)—$(OH)_n$, $(R^1)_{3-n}$—P(O)—$(OH)_n$, $(R^1O)$—S(O)(O)—(OH), $R^1$—S(O)(O)—(OH), and $(R^1)_{4-m}$—Si$(R^4)_m$, wherein $R^1$ represents a group comprising a carbon atom and at least one element selected from the group consisting of an oxygen atom, a nitrogen atom, and a sulfur atom, and having the total number of carbon atoms, oxygen atoms, nitrogen atoms, and sulfur atoms of 8 or less; $R^4$ represents a halogen atom or —$OR^2$, and $R^2$ represents a hydrogen atom or an alkyl group; and n represents 1 or 2, and m represents an integer of 1 to 3.

17 Claims, No Drawings

(56) References Cited

U.S. PATENT DOCUMENTS

| | | | |
|---|---|---|---|
| 6,572,693 B1* | 6/2003 | Wu | A61K 6/0017 |
| | | | 106/35 |
| 6,730,156 B1 | 5/2004 | Windisch | |
| 2002/0004544 A1 | 1/2002 | Kolb et al. | |
| 2002/0156152 A1 | 10/2002 | Zhang et al. | |
| 2007/0072112 A1 | 3/2007 | Prokopowicz et al. | |
| 2007/0111879 A1 | 5/2007 | Kong | |
| 2009/0004098 A1* | 1/2009 | Schmidt | C04B 35/486 |
| | | | 423/608 |
| 2015/0072290 A1 | 3/2015 | Prokopowicz et al. | |
| 2017/0031244 A1* | 2/2017 | Thackeray | G03F 7/0045 |

FOREIGN PATENT DOCUMENTS

| | | |
|---|---|---|
| JP | 63-25205 | 2/1988 |
| JP | 64-83520 | 3/1989 |
| JP | 2003-512287 | 4/2003 |
| JP | 2008-44835 | 2/2008 |
| JP | 2011-105580 | 6/2011 |
| WO | 2013/133281 | 9/2013 |

OTHER PUBLICATIONS

Office Action dated Nov. 6, 2018 in corresponding Taiwanese Application No. 106104047, with English translation.
Notification of Reasons for Rejection dated Jan. 21, 2020 in corresponding Japanese Patent Application No. 2016-141696, with English language translation.
Office Action dated Jan. 6, 2020 in corresponding Chinese Patent Application No. 201780019378.8 with English-language translation.
Extended European Search Report dated Nov. 15, 2019 in European Patent Application No. 17769657.2.
Office Action dated May 26, 2020 in corresponding Japanese Patent Application No. 2016-141696, with Machine translation.
Office Action dated Jun. 28, 2020 in corresponding Chinese Patent Application No. 201780019378.8, with Machine translation.
Office Action dated Nov. 24, 2020 in corresponding Japanese Patent Application No. 2016-141696 with English-language translation.
Decision of Rejection dated Nov. 13, 2020 in corresponding Chinese Patent Application No. 201780019378.8, with English translation.

* cited by examiner

ZIRCONIUM OXIDE NANOPARTICLES

TECHNICAL FIELD

The present invention relates to zirconium oxide nanoparticles.

BACKGROUND ART

In recent years, metal oxide nanoparticles have been drawing attention in a field of various functional materials because the nanoparticles have a possibility of allowing, for example, optical materials and electronic component materials to develop various functions. A metal oxide alone, however, is insufficient in dispersibility in an organic medium to be aggregated in many cases, causing a problem of a decrease in transparency and in mechanical strength. In order to impart to the metal oxide good dispersibility in an organic medium, proposed is a method of chemically bonding an organic group to the metal oxide.

For example, Patent Document 1. discloses zirconium oxide nanoparticles coated with two or more coating agents at least one of which is represented by a formula R—COOH (R is a hydrocarbon group having 6 or more carbon atoms), and disclose that such zirconium oxide nanoparticles are capable of improving dispersibility in, for example, a non-polar solvent.

On the other hand, a liquid in which zirconium oxide nanoparticles are dispersed is used in various examples, and when polycarbonate is used as a resin substrate, an erosive non-polar solvent such as methyl ethyl ketone is not preferred and a dispersion liquid is required that contains a polar solvent such as water or ethanol as a dispersion medium. Further, along with a change of required physical properties for, for example, optical materials and electronic component materials, a monomer having higher polarity than a conventional monomer for optical materials has been used, and thus the zirconium oxide nanoparticles themselves are required to be dispersed in a polar solvent. Particularly, formation of a laminated film is controlled by polarity of a solvent to give a uniform laminated film, so that the dispersibility of the zirconium oxide nanoparticles has been strongly desired to be controlled. Patent Document 1, however, does not disclose examples of using methanol, which is a representative polar solvent, and has not given zirconium oxide nanoparticles having sufficient dispersibility in a solvent having higher polarity, such as water or ethanol. Further, even when these zirconium oxide nanoparticles are capable of being dispersed in a non-polar solvent, there is an upper limit of metal oxide concentration in a dispersion liquid (core concentration; a concentration calculated by a formula (A)). Thus, zirconium oxide nanoparticles are being required that are capable of being dispersed at a higher concentration.

PRIOR ART DOCUMENT

Patent Document

Patent Document 1: JP-A-2008-44835

SUMMARY OF THE INVENTION

Problem to be Solved by the Invention

An object of the present invention is to provide zirconium oxide nanoparticles that have excellent dispersibility in a polar solvent and are capable of increasing a core concentration in a dispersion liquid.

Solutions to the Problem

The present invention that has solved the problems described above is as follows.

[1] Zirconium oxide nanoparticles coated with at least one compound selected from the group consisting of $R^1$—COOH, $(R^1O)_{3-n}$—P(O)—$(OH)_n$, $(R^1)_{3-n}$—P(O)—$(OH)_n$, $(R^1O)$—S(O)(O)—(OH), $R^1$—S(O)(O)—(OH), and $(R^1)_{4-m}$—Si$(R^4)_m$, wherein $R^1$ represents a group comprising a carbon atom and at least one element selected from the group consisting of an oxygen atom, a nitrogen atom, and a sulfur atom, and having the total number of carbon atoms, oxygen atoms, nitrogen atoms, and sulfur atoms of 8 or less.

$R^4$ represents a halogen atom or —$OR^2$, and $R^2$ represents a hydrogen atom or an alkyl group; and n represents 1 or 2, and m represents an integer of 1 to 3.

[2] The zirconium oxide nanoparticles according to [1], wherein $R^1$ has a ratio of a sum of the number of oxygen atoms, nitrogen atoms, and sulfur atoms to the number of carbon atoms (sum of the number of oxygen atoms, nitrogen atoms, and sulfur atoms/number of carbon atoms) of 1/7 or more and 1/1 or less.

[3] The zirconium oxide nanoparticles according to [1] or [2], wherein the compound has a ratio of the number of oxygen atoms to the number of carbon atoms (number of oxygen atoms/number of carbon atoms) of more than 1/6 and 1/0.2 or less.

[4] The zirconium oxide nanoparticles according to any one of [1] to [3], wherein a total of a tetragonal crystal and a cubic crystal is 60% or more of entire crystal structures.

[5] The zirconium oxide nanoparticles according to any one of [1] to [4], having an average particle diameter of 1 to 100 nm.

[6] The zirconium oxide nanoparticles according to any one of [1] to [5], wherein $R^1$ has a Hansen solubility parameter (HSP) distance to ethanol of 0 $(MPa)^{1/2}$ or more and 20 $(MPa)^{1/2}$ or less

[7] The zirconium oxide nanoparticles according to any one of [1] to [5], wherein $R^1$ has a Hansen solubility parameter (HSP) distance to water of 20 $(MPa)^{1/2}$ or more and 41 $(MPa)^{1/2}$ or less.

[8] A dispersion liquid comprising the zirconium oxide nanoparticles according to any one of [1] to [7].

[9] The dispersion liquid according to [8], comprising a solvent having a Hansen solubility parameter (HSP) distance to water of 0 $(MPa)^{1/2}$ or more and 40 $(MPa)^{1/2}$ or less.

[10] A resin composition comprising the zirconium oxide nanoparticles according to any one of [1] to [7].

[11] The resin composition according to [10], comprising at least one resin component selected from a monomer, an oligomer, and a polymer.

[12] The resin composition according to [10] or [11], comprising a solvent having a Hansen solubility parameter (HSP) distance to water of 0 $(MPa)^{1/2}$ or more and 40 $(MPa)^{1/2}$ or less.

[13] A molded material comprising the zirconium oxide nanoparticles according to any one of [1] to [7].

[14] A ceramic material comprising the zirconium oxide nanoparticles according to any one of [1] to [7].

[15] A process for producing a ceramic material, comprising firing the zirconium oxide nanoparticles according to any one of [1] to [7] at 500° C. or higher.

[16] A process for producing a ceramic material, comprising firing a composition comprising the zirconium oxide nanoparticles according to any one of [1] to [7] at 500° C. or higher.

Effect of the Invention

According to the present invention, it is possible to obtain zirconium oxide nanoparticles that have excellent dispersibility in a polar solvent such as water or alcohol, and are capable of increasing a core concentration in a dispersion liquid, because the zirconium oxide nanoparticles are coated with a specific group $R^1$.

Mode for Carrying Out the Invention

Zirconium oxide nanoparticles according to the present invention are coated with a compound selected from the group consisting of $R^1$—COOH, $(R^1O)_{3-n}$—P(O)—$(OH)_n$, $(R^1)_{3-n}$—P(O)—$(OH)_n$, $(R^1O)$—S(O)(O)—(OH), $R^1$—S(O)(O)—(OH), and $(R^1)_{4-m}$—Si $(R^4)_m$ (hereinafter, sometimes simply and collectively referred to as a "compound (1)"), each of which has a group $R^1$, to increase dispersibility in a polar solvent such as water or alcohol, and therefore, when being formed into a laminated film, a film can be formed corresponding to polarity of the solvent. It is also possible to increase a core concentration in a dispersion liquid to enlarge a range of choices of a solvent used for film formation.

In the present invention, the total number of carbon atoms, oxygen atoms, nitrogen atoms, and sulfur atoms included in $R^1$ is set to 8 or less to enable a decrease in molecular weight of the compound (1), so that it is possible to relatively increase proportion (% by mass) of a zirconium oxide component in the zirconium oxide nanoparticles. This enables the zirconium oxide nanoparticles to exhibit their performance more strongly to allow, for example, production of a coating film having a higher refractive index from a resin composition containing the zirconium oxide nanoparticles according to the present invention. A lower limit of the total number of carbon atoms, oxygen atoms, nitrogen atoms, and sulfur atoms included in $R^1$ is 2 or more, more preferably 7 or less, further preferably 5 or less, further more preferably 4 or less, particularly preferably 3 or less. In order to increase metal oxide concentration of the zirconium oxide nanoparticles, the less the total number of carbon atoms, oxygen atoms, nitrogen atoms, and sulfur atoms included in $R^1$ is, the more preferable the zirconium oxide nanoparticles are.

Characteristics of $R^1$ can be evaluated by a Hansen solubility parameter (HSP). The Hansen solubility parameter (HSP) is a value used to predict solubility of a substance. The. HSP includes three parameters that are energy (D) of dispersion force between molecules, energy (P) of dipole interaction between molecules, and energy (H) of hydrogen bonding between molecules. These three parameters can be recognized as coordinates in a three-dimensional space. Two substances (substances 1 and 2) are more soluble to each other when the distance is shorter between the HSPs of the two substances (substances 1 and 2) placed in the three-dimensional space. A distance $R^3$ between HSPs is derived from a following equation.

$$(R^3)^2 = 4*(D_1-D_2)^2 + (P_1-P_2)^2 + (H_1-H_2)^2$$

[In the equation, $D_1$, $P_1$, and $H_1$ are the HSP parameters of the substance 1 and $D_2$, $P_2$, and $H_2$ are the HSP parameters of the substance 2.]

HSP distance of $R^1$ to ethanol is preferably 0 $(MPa)^{1/2}$ or more, more preferably 5 $(MPa)^{1/2}$ or more, further preferably 10 $(MPa)^{1/2}$ or more and preferably 20 $(MPa)^{1/2}$ or less, more preferably 18 $(MPa)^{1/2}$ or less, further preferably 17 $(MPa)^{1/2}$ or less. The HSP distance is adjusted within the above range to enable an increase in dispersibility of the zirconium oxide nanoparticles in a polar solvent such as alcohols.

The HSP distance of $R^1$ to water is preferably 20 $(MPa)^{1/2}$ or more, more preferably 25 $(MPa)^{1/2}$ or more, further preferably 30 $(MPa)^{1/2}$ or more and preferably 41 $(MPa)^{1/2}$ or less, more preferably 39 $(MPa)^{1/2}$ or less, further preferably 38 $(MPa)^{1/2}$ or less. The HSP distance of $R^1$ to water is adjusted within the above range to enable an increase in dispersibility of the zirconium oxide nanoparticles in a polar solvent such as water.

In order to increase the dispersibility of the zirconium oxide nanoparticles, $R^1$ has a ratio of a sum of the number of oxygen atoms, nitrogen atoms, and sulfur atoms to the number of carbon atoms (sum of the number of oxygen atoms, nitrogen atoms, and sulfur atoms/number of carbon atoms) of preferably 1/7 or more, more preferably 1/5 or more, further preferably 1/3 or more and preferably 1/1 or less, more preferably 1/1.3 or less, further preferably 1/1.6 or less.

$R^1$ has a ratio of the number of oxygen atoms to the number of carbon atoms (number of oxygen atoms/number of carbon atoms) of preferably 1/7 or more, more preferably 1/5 or more, further preferably 1/3 or more and preferably 1/1 or less, more preferably 1/1.3 or less, further preferably 1/1.6 or less. $R^1$ having a certain ratio or more of oxygen atoms to carbon atoms contributes, because of an increase in hydrophilicity of $R^1$, to an increase in dispersibility of the zirconium oxide nanoparticles in a polar solvent.

$R^1$ is, for example, a hydrocarbon group and the hydrocarbon group is preferably a group having a part of elements substituted by at least one element selected from the group consisting of an oxygen atom, a nitrogen atom, and a sulfur atom. Examples of a substituent for the element included in the hydrocarbon group include groups substituting a carbon atom, such as an ether bond, a carbonyl group, a thioketone group, a sulfide bond, a sulfoxide group, a carbamoyl group, a >NH group, and a >N-group; groups substituting a hydrogen atom, such as a hydroxy group, a thiol group, an —$NH_2$ group, a carboxyl group, a cyano group, a ureido group, and an isocyanate group. The substituent is preferably an ether bond, a hydroxy group, or an —$NH_2$ group, more preferably an ether bond.

Examples of the hydrocarbon group as $R^1$ include a chain hydrocarbon group and a cyclic hydrocarbon group. The hydrocarbon group of $R^1$ is preferably a chain hydrocarbon group.

The chain hydrocarbon group is preferably both saturated and unsaturated, and a chain saturated hydrocarbon group is more preferable. The chain hydrocarbon group is preferably both straight-chain and branched-chain, and a straight-chain hydrocarbon group is more preferable. The chain hydrocarbon group is preferably a chain saturated hydrocarbon group, more preferably a straight-chain saturated hydrocarbon group.

The cyclic hydrocarbon group is preferably both saturated and unsaturated.

R[1] is a group preferably having an oxygen atom, and more preferably composed of a hydrogen atom, a carbon atom, and an oxygen atom.

The compound (1) has any one of R[1]—C, R[1]—O, R[1]—P, R[1]—S, and R[1]—Si as a partial structure, and R[1] preferably has a carbon atom at a bond terminal in this R[1]-site. The carbon atom at the bond terminal of R[1] is preferably formulae (A-1) to (A-4) (in the formulae, a single bond corresponds to the bond in the R[1]-site), more preferably the formula (A-1). In the formula (A-4), one single bond and one double bond may be bonds as one aspect of a resonance structure. Accordingly, examples of the one single bond and the one double bond in the formula (A-4) include a case where the bonds are parts of an aromatic ring.

[Chemical Formula 1]

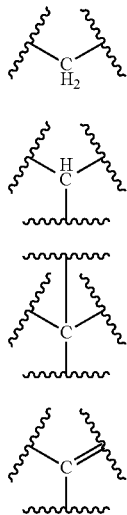

(A-1)

(A-2)

(A-3)

(A-4)

The compound (1) has a ratio of the number of oxygen atoms to the number of carbon atoms (number of oxygen atoms/number of carbon atoms) of preferably more than 1/6, more preferably 1/2 or more, further preferably 1/1.4 or more and preferably 1/0.2 or less, more preferably 1/0.8 or less, further preferably 1/0.9 or less. The compound (1) having a certain ratio or more of oxygen atoms to carbon atoms contributes to an increase in content of the zirconium oxide nanoparticles in a polar solvent.

Examples of R[1]—COOH include ether bond-containing carboxylic acids such as methoxyacetic acid, ethoxyacetic acid, 3-ethoxypropionic acid, and 2-methoxyethoxyacetic acid; carbonyl group-containing carboxylic acids such as glyoxylic acid, pyruvic acid, levulinic acid, 2-oxovaleric acid, asparagine, glutamine, 8-methyllevulinic acid, and α-methyllevulinic add; sulfide bond-containing carboxylic acids such as methionine; hydroxy group-containing carboxylic acids such as glycolic acid, DL-lactic acid, 2-hydroxyisobutyric acid, dimethylolpropionic acid, hydroxypivalic acid, 3-hydroxypropionic acid, DL-2-hydroxybutyric acid, DL-3-hydroxybutyric acid, 2-hydroxy-2-methylbutyric acid, 6-hydroxyisovaleric acid, 2,2-bighydroxymethylibutyric acid, serine, threonine, 4-hydroxycyclohexanecarboxylic acid, and (o-, m-, p-)hydroxybenzoic acid; thiol group-containing carboxylic acids such as thioglycolic acid, thiolactic acid, and cysteine; —NH$_2$ group-containing carboxylic acids such as glycine, alanine, 2-methylalanine, cysteine, serine, threonine, valine, leucine, isoleucine, methionine, and lysine; carbamoyl group-containing carboxylic acids such as asparagine and glutamine', dicarboxylic acids such as aspartic acid and glutamic acid; cyano group-containing carboxylic acids such as cyanoacetic add; and heterocyclic compounds substituted by a carboxyl group, such as proline.

Examples of (R[1]O)$_{3-n}$—P(O)-(OH)$_n$ or (R[1])$_{3-m}$—P(O)-(OH)$_n$ include methoxymethyl phosphate, di(methoxymethyl)phosphate, DL-glyceraldehyde-3-phosphate, and glycerol phosphate.

Examples of (R[1]O)—S(O)(O)—(OH) or R[1]—S(O)(O)—(OH) include methoxymethyl sulfate and L-serine-O-sulfate potassium salt.

Examples of (R[1])$_{4-m}$—Si(R[4])$_m$, with R[4] being a halogen atom, preferably a chlorine atom, include methoxymethyltrichlorosilane, methoxyethyltrichlorosilane, (3-aminopropyl)trichlorosilane, (3-mercaptopropyl)trichlorosilane, 2-cyanoethyltrichlorosilane, [3-(N,N-dimethylamino)propyl]trichlorosilane, 3-(methylamino) propyltrichlorosilane, 3-cyanopropyltrichlorosilane, (3-ureidopropyl)trichlorosilane, (3-isocyanatopropyl)trichlorosilane, 3-(2-aminoethylamino) propyltrichlorosilane, and methyl [3-(trichlorosilyl)propyl]carbamate.

In (R[1])$_{4-m}$—Si(R[4])$_m$ with R[4] being OR[2], R[2] is a hydrogen atom or an alkyl group, preferably a hydrogen atom or an alkyl group having 1 to 6 (particularly, 1 to 4) carbon atoms, more preferably an alkyl group having 1 to 4 carbon atoms (particularly, a methyl group or an ethyl group). Examples of (R[1])$_{4-m}$—Si(OR[2])$_m$ with R[2] being an alkyl group include methoxymethyltrimethoxysilane, methoxyethyltriethoxysilane, (3-aminopropyl)trimethoxysilane, (3-mercaptopropyl)trimethoxysilane, 2-cyanoethyltriethoxysilane, [3-(N,N-dimethylamino) propyl]trimethoxysilane, 3-(methylamino) propyltrimethoxysilane, 3-cyanopropyltrimethoxysilane, (3-ureidopropyl)trimethoxysilane, (3-isocyanatopropyl) triethoxysilane, 3-(2-aminoethylamino)propyltrimethoxysilane, and methyl [3-(trimethoxysilyl)propyl]carbamate.

m is preferably 2 or 3, more preferably 3. Examples of (R[1])$_{4-m}$—Si(OR[2])$_m$ with R[2] being a hydrogen atom include methoxymethyltrihydroxysilane, methoxyethyltrihydroxysilane, (3-aminopropyl)trihydroxysilane, (3-mercaptopropyl)trihydroxysilane, 2-cyanoethyltrihydroxysilane, [3-(N,N-dimethylamino) propyl]trihydroxysilane, 3-(methylamino) propyltrihydroxysilane, 3-cyanopropyltrihydroxysilane, (3-ureidopropyl)trihydroxysilane, (3-isocyanatopropyl) trihydroxysilane, 3-(2-aminoethylamino)propyltrihydroxysilane, and methyl [3-(trihydroxysilyl)propyl]carbamate.

The compound represented by (R[1])$_{4m}$—Si(R[4])$_m$ is preferred not to be tetraethoxysilane, more preferred not to be tetraalkoxysilane.

The compound that coats the zirconium oxide nanoparticles is preferably R[1]-COOH, more preferably an ether bond-containing carboxylic acid, further preferably methoxyacetic acid, ethoxyacetic acid, 3-ethoxypropionic acid, or 2-methoxyethoxyacetic acid, particularly preferably methoxyacetic acid or ethoxyacetic acid.

An amount of the compound (1) in the zirconium oxide nanoparticles is 5 to 35% by mass (preferably 8% by mass or more, more preferably 10% by mass or more and preferably 33% by mass or less, more preferably 30% by mass or less).

The phrase "the zirconium oxide nanoparticles are coated with the compound (I)" means both chemical and physical bonding of the compound (1) to the zirconium oxide nanoparticles. In cases where the compound (1) is a carboxylic acid, the phrase means that the zirconium oxide nanoparticles are coated with, for example, the compound (1) and/or a carboxylate derived from the compound (1).

The zirconium oxide nanoparticles may be coated with a second compound other than the compound (1). Examples of the second compound include a carboxylic acid (except the compound (1); hereinafter, sometimes referred to as a "carboxylic acid (2)") that can be mixed in a raw material of the compound (1). The second compound may be contained in the zirconium oxide particles to a degree in which a coating effect of the compound (1) is not impaired, and an amount of the second compound in the zirconium oxide nanoparticles is preferably 30% by mass or less, more preferably 10% by mass or less, further preferably 5% by mass or less.

The carboxylic acid (2) is preferably a carboxylic acid having 3 to 22 (preferably 4 to 20) carbon atoms, and the carboxylic acid (2) includes all a primary carboxylic acid, a secondary carboxylic acid, and a tertiary carboxylic acid.

The primary carboxylic acid is preferably a straight-chain primary carboxylic acid having 4 to 20 carbon atoms or a branched primary carboxylic acid having 4 to 20 carbon atoms (that is, a carboxylic acid branched at a carbon atom other than a carbon). The straight-chain carboxylic acid is preferably a straight-chain saturated aliphatic carboxylic acid, and specific examples include butyric acid, valeric acid, hexanoic acid, heptanoic acid, caprylic acid, nonanoic acid, decanoic acid, lauric acid, tetradecanoic acid, stearic acid, oleic acid, and ricinoleic acid. Examples of the branched primary carboxylic acid include isovaleric acid, 3,3-dimethylbutyrie acid, 3-methylvaleric acid, isononanoic acid, 4-methylvaleric acid, 4-methyl-n-octanoic acid, and naphthenic acid.

The secondary carboxylic acid is preferably a secondary carboxylic acid having 4 to 20 carbon atoms, and specific examples include isobutyric acid, 2-methylbutyric acid, 2-ethylbutyric acid, 2-ethylhexanoic acid, 2-methylvaleric acid, 2-methylhexanoic acid, 2-methylheptanoic acid, 2-propylbutyric acid, 2-hexylvaleric acid, 2-hexyldecanoic acid, 2-heptylundecaonic acid, 2-methylhexadecanoic acid, and 4-methylcyclohexanecarboxylic acid. The secondary carboxylic acid is preferably at least one of 2ethylhexanoic acid and 2-hexyldecaonic acid, particularly preferably 2-ethylhexanoic acid.

The tertiary carboxylic acid is preferably a tertiary carboxylic acid having 5 to 20 carbon atoms, and specific examples include pivalic acid, 2,2-dimethylbutyric acid, 2,2-dimethylvaleric acid, 2,2-dimethylhexanoic acid, 2,2-dimethylheptanoic acid, and neodecanoic acid.

The zirconium oxide nanoparticles mainly comprise zirconium. The zirconium oxide nanoparticles, however, may further contain at least one selected from Al and rare-earth elements for stabilizing a crystal structure of the zirconium oxide crystal. The zirconium oxide nanoparticles containing at least one of these metals increase in proportion of a tetragonal crystal and/or a cubic crystal in the particles, and are capable of suppressing a decrease of the tetragonal crystal when the zirconium oxide nanoparticles are fired, and thus increase the proportion of the tetragonal crystal after the firing Examples of the rare-earth elements include Sc (scandium), Y (yttrium), and lanthanoid elements with atomic numbers from 57 (La) to 71 (Lu).

Among Al and the rare-earth elements, preferred is at least one selected from Al, Y, La, Yb, Sc, Ce, and Er, and more preferred is at least one selected from Al, Y, Sc, and Er.

In the zirconium oxide nanoparticles containing Al and a rare-earth element, Al and the rare-earth element are desirably contained in an amount of preferably 0 to 20% by mass, more preferably 3 to 20% by mass, further preferably 5 to 20% by mass in a total 100% by mass of zirconium of zirconium oxide, Al, and the rare-earth element.

The zirconium oxide nanoparticles may also contain a metal element other than zirconium, Al, and the rare-earth elements. A content rate of zirconium contained in the nanoparticles according to the present invention, however, is preferably 60% by mass or more, more preferably 70% by mass or more, further preferably 80% by mass or more in the entire metal elements contained in the zirconium nanoparticles. The smaller a content rate of the other metal element is, the more preferable the zirconium oxide nanoparticles are. The content rate of the metal element other than zirconium, Al, the rare-earth elements, and hafnium usually contained as an impurity of zirconium is preferably 3% by mass or less, more preferably 1% by mass or less and may be 0% by mass in the entire metal elements contained in the nanoparticles.

Crystal structures of the zirconium oxide nanoparticles include a cubic crystal, a tetragonal crystal, and a monoclinic crystal, and a total of the tetragonal crystal and the cubic crystal is preferably 60% or more of the entire crystal structures. Total proportion of the tetragonal crystal and the cubic crystal is preferably 70% or more, more preferably 80% or more. Particularly, in the zirconium oxide nanoparticles containing Al or a rare-earth element, the tetragonal crystal and/or the cubic crystal are/is stable, so that the proportion of the tetragonal crystal and/or the cubic crystal is likely to increase in the nanoparticles. Further, the zirconium oxide nanoparticles containing Al or a rare-earth element are likely to maintain the tetragonal crystal and/or the cubic crystal even after fired.

As shapes of the zirconium oxide nanoparticles, there can be exemplified a spherical shape, a granular shape, an oval spherical shape, a cubic shape, a rectangular parallelepiped shape, a pyramid shape, a needle shape, a columnar shape, a bar shape, a tubular shape, a scale shape, a plate-like shape, and a flake shape. In consideration of the dispersibility of the zirconium oxide nanoparticles in a solvent and the like, the shapes are preferably, a spherical shape, a granular shape, or a columnar shape, for example.

A crystallite diameter of the tetragonal crystal and/or the cubic crystal of the zirconium oxide nanoparticles that is calculated by X-ray diffraction analysis is preferably 30 nm or less, more preferably 20 nm or less. This can improve transparency of a composition containing the zirconium oxide nanoparticles. The crystallite diameter is more preferably 20 nm or less, further preferably 15 nm or less. A lower limit of the crystallite diameter is usually about 1 nm.

Particle diameters of the zirconium oxide nanoparticles can be evaluated by an average particle diameter determined by processing images obtained by various electron microscopes, and the average particle diameter (average primary particle diameter) is preferably 100 nm or less, more preferably 50 nm or less, further preferably 30 nm or less. A lower limit is not particularly set but is usually 1 nm. Adjustment of the average particle diameter within the above range can increase the transparency of the composition containing the zirconium oxide nanoparticles.

The average particle diameter can be determined by enlarging the zirconium oxide nanoparticles with, for example, a transmission electron microscope (TEM), a field-emission transmission electron microscope (FE-TEM), or a field-emission scanning electron microscope (FE-SEM), measuring length along a major axis of any randomly selected 100 particles, and calculating an arithmetic average of the length.

The zirconium oxide nanoparticles are produced by contacting zirconia-containing particles with the compound (1). Contact temperature is preferably 0 to 120° C., more preferably 10 to 100° C., further preferably 20 to 80° C. When contacted with the compound (1), the zirconia-containing particles may have been dispersed or dissolved in an organic solvent. As the organic solvent, there can be exemplified a solvent used in a hydrothermal reaction described later.

The zirconia-containing particles are produced by hydrothermal reacting a zirconium component and the carboxylic acid (2), and as necessary, an Al or rare-earth element component. As the zirconium component, it is possible to use a zirconium, raw material substance composed of the carboxylic acid (2), and either zirconium or a zirconium-containing compound (preferably as a bonded body). In order to synthesize nanoparticles containing Al or a rare-earth element component, it is possible to use an Al or rare-earth element raw material substance composed of the carboxylic acid (2) and at least one of Al, a rare-earth element, an Al-containing compound, or a rare-earth element-containing compound (preferably as a bonded body).

The zirconium raw material substance can be specifically at least one selected from (i) a salt of the carboxylic acid (2) with a zirconium oxide precursor, (ii) a zirconium salt of the carboxylic acid (2), and (iii) the carboxylic acid (2) and a zirconium oxide precursor.

Examples of the zirconium oxide precursor include a hydroxide, a chloride, an oxychloride, an acetate, an oxyacetate, an oxynitrate, a sulfate, a carbonate, and an alkoxide of zirconium. That is, the examples include zirconium hydroxide, zirconium chloride, zirconium oxychloride, zirconium acetate, zirconium oxyacetate, zirconium oxynitrate, zirconium sulfate, zirconium carbonate, and zirconium alkoxides such as tetrabutoxy zirconium.

Hereinafter, the case (i) is described in detail. The salt may be not only a single type compound composed of the carboxylic acid (2) and the zirconium oxide precursor at stoichiometric proportion but also a composite salt or a composition containing the carboxylic acid (2) or the zirconium oxide precursor that has not been reacted.

In the case (i), the salt of the carboxylic acid (2) with the zirconium oxide precursor is preferably a salt of the carboxylic acid (2) with zirconium that is obtained by a reaction of the zirconium oxide precursor and a carboxylate salt-containing composition derived from the carboxylic acid (2) and having a degree of neutralization in a range of 0.1 to 0.8 (more preferably 0.2 to 0.7). In the case where the degree of neutralization is less than 0.1, the carboxylic acid (2) has low solubility, so that the salt may not be sufficiently formed. In the case where the degree of neutralization is more than 0.8, a great amount of white precipitate assumed as a hydroxide of zirconium may be generated to decrease a yield of coated type zirconium oxide particles. The degree of neutralization is preferably adjusted by an alkali metal and/or an alkali earth metal, and suitably used is an alkali metal that forms a salt having high water solubility, particularly sodium or potassium.

Ratio between the carboxylate salt-containing composition and the zirconium oxide precursor is preferably 1 mol to 20 mol, more preferably 1.2 to 18 mol, further preferably 1.5 to 15 mol of carboxyl groups, relative to 1 mol of the zirconium oxide precursor.

A reaction of the carboxylate salt-containing composition with the zirconium oxide precursor is preferably performed by, mixing aqueous solutions with each other or mixing an aqueous solution with an organic solvent. Reaction temperature is not particularly limited as long as the aqueous solution(s) is maintained but is preferably room temperature to 100° C., more preferably 40° C. to 80° C.

The salt obtained by the reaction of the carboxylate salt-containing composition with the zirconium oxide precursor may be directly subjected to a hydrothermal reaction but preferably undergoes processes such as filtration or separation to remove an insoluble side product.

Next, the case (ii) is described in detail.

In an embodiment of the case (ii), a zirconium salt of the carboxylic acid (2) is used that has been prepared in advance, which brings an advantage of being subjected to a hydrothermal reaction without the complicated steps described above. Easily available compounds, however, are limited, so that zirconium oxide particles coated with the target organic group may not possibly be obtained.

Examples of the zirconium salt that can be used in the embodiment of the case (ii) include zirconium octanoate, zirconium 2-ethylhexanoate, zirconium stearate, zirconium laurate, zirconium naphthenate, zirconium oleate, and zirconium ricinoleate. Although a zirconium salt having low purity is sometimes used after being purified, a commercially available zirconium salt or a salt that has been prepared in advance can be directly subjected to a hydrothermal reaction.

The zirconium oxide precursor that can be used in the case (iii) is the same zirconium oxide precursor as described above. In the case the zirconium oxide precursor is preferably zirconium carbonate. Ratio between the carboxylic acid (2) and the zirconium oxide precursor is preferably 0.5 mol to 10 mol, more preferably 1 mol to 8 mol, further preferably 1.2 mol to 5 mol of the carboxylic acid (2), relative to 1 mol of the zirconium oxide precursor. The carboxylic acid (2) and the zirconium oxide precursor may be directly subjected to a hydrothermal reaction or may be reacted in advance before a hydrothermal reaction. For the reaction before a hydrothermal reaction, the carboxylic acid (2) is preferably reacted with the zirconium oxide precursor in an organic solvent as a slurry. In the reaction, water generated during the reaction is preferably removed, in order to improve reaction speed or yield. Since the reaction is performed while water is extracted, it is preferable to use, as a reaction solvent, a solvent having a higher boiling point than a boiling point of water, more preferable to use a solvent that is used for a hydrothermal reaction described later. Reaction temperature is preferably 70° C. or higher, more preferably 80° C. or higher so as to allow water to be extracted. An upper limit of the reaction temperature is 180° C. or lower, more preferably 150° C. or lower. Excessively high temperature triggers a side reaction to possibly cause decomposition of the carboxylic acid. In cases where water is not well extracted during the reaction, the reaction can also be progressed while reaction pressure is reduced to lower the boiling point of water.

Al or rare-earth element raw material substance can be specifically at least one selected from (i) a salt of the carboxylic acid (2) with a precursor of, for example, a rare-earth element oxide, (ii) a salt of the carboxylic acid (2) with, for example, a rare-earth element, and (iii) the carboxylic acid (2) and a precursor of, for example, a rare-earth element oxide. Preferable aspects of the cases (i) to (iii) are the same as the preferable aspects of the cases (i) to (iii) for the zirconium raw material substance.

At least one of the cases (i) to (iii) as the zirconium component and at least one of the cases (i) to (iii) in cases of adding Al or rare-earth element component are mixed preferably in the presence of water. At this time, mixing under heating or reducing pressure is suitable because a low-boiling point compound contained in the zirconium oxide, such as ammonia or acetic acid, can be expelled from the system to prevent an increase in pressure in the following step of the hydrothermal reaction. The reaction may also be performed in a solution to which an organic solvent described later has been, added.

Next, the hydrothermal reaction is described.

At least one of the cases (i) to (iii) as the zirconium component and at least one of the cases (i) to (iii) in cases of adding Al or rare-earth element component are subjected to the hydrothermal reaction to give a zirconium oxide nanoparticle composition. In cases where the hydrothermal reaction only with the cases (i) to (iii) does not efficiently proceed due to high viscosity, adding an organic solvent is helpful in which the cases (i) to (iii) show good solubility. In order to obtain the zirconium oxide nanoparticles, it is preferable to use the zirconium salt of the carboxylic add (2) and the salt of the carboxylic acid (2) with, for example, a rare-earth element particularly as the zirconium component and Al or rare-earth element component, respectively.

As the organic solvent, it is possible to use, for example, a hydrocarbon, a ketone, an ether, or an alcohol. A solvent that vaporizes during the hydrothermal reaction may not possibly sufficiently progress the reaction. Therefore, the organic solvent having a boiling point under ordinary pressure of 120° C. or higher is preferable, more preferably 140° C. or higher, further preferably 150° C. or higher. Specific examples include decane, dodecane, tetradecane, mesitylene, pseudocumene, mineral oil, octanol, decanol, cyclohexanol, terpineol, ethylene glycol, diethylene glycol, 1,2-propanediol, 1,3-propanediol, 1,4-butanediol, 2,3-butanediol, hexanediol, glycerol, methanetrimethylol, toluene, xylene, trimethylbenzene, dimethylformamide (DMF), and dimethyl sulfoxide (DMSO). Preferred are mineral oil, dodecane, tetradecane, and trimethylbenzene.

In cases where addition of the organic solvent causes separation of the composition into two layers, for example, a surfactant may be added to form a uniform phase or an emulsified suspension. The composition having two layers, however, can be directly subjected to the hydrothermal reaction. The composition sometimes contains a sufficient amount of water derived from the raw material(s). However, in cases where no moisture or a small amount of moisture is contained in the raw material(s), it is necessary to add moisture before subjecting the composition to the hydrothermal reaction.

As regards an amount of moisture present in a hydrothermal reaction system, ratio of the number of moles of water to the number of moles of the zirconium oxide precursor or the salt containing zirconium (hereinafter, the zirconium oxide precursor and the like) present in the system (number of moles of water/number of moles of zirconium oxide precursor and the like) is preferably 4/1 to 100/1, more preferably 8/1 to 50/1. The ratio of less than 4/1 may cause prolonged time of the hydrothermal reaction or increase of the diameter of the obtained zirconium particles On the other hand, with the ratio being more than 100/1, there is no particular problem other than a decrease in productivity due to the small amount of the zirconium oxide precursor and the like present in the system.

The hydrothermal reaction is preferably performed at a pressure of 2 MPaG (gauge pressure) or less. Even with a pressure of more than 2 MPaG, the reaction proceeds but such a pressure requires an expensive reaction device and thus is not industrially preferable. On the other hand, excessively low pressure delays progress of the reaction, which sometimes cause the nanoparticles to increase their diameters due to a long time of the reaction or cause zirconium oxide to have a plurality of crystal systems. Therefore, the reaction is performed at a pressure of preferably 0.1 MPaG or more, more preferably 0.2 MPaG or more. Time of the hydrothermal reaction is, for example, about 2 to 24 hours.

The zirconium oxide nanoparticles have good dispersibility in various media, so that they can be added to, for example, a variety of solvents, a monomer (a monofunctional monomer and/or a crosslinkable monomer), an oligomer, a polymer, or a combination thereof. The present invention also encompasses a composition containing the zirconium oxide nanoparticles. The composition includes a dispersion liquid containing the zirconium oxide nanoparticles and a solvent, and a resin composition containing the zirconium oxide nanoparticles and at least one resin component selected from a monomer, an oligomer, and a polymer.

The resin composition includes a composition containing a polymer and the zirconium oxide nanoparticles; a composition containing a polymerizable monomer such as a mixture of a dicarboxylic acid with a diamine, an unsaturated carboxylic add (e.g., acrylic acid and methacrylic acid), or an ester compound of the unsaturated carboxylic acid, and the zirconium oxide nanoparticles; and a composition containing the polymer, the polymerizable monomer, and the zirconium oxide nanoparticles The resin component may be a molding resin used as a molded material for, for example, an optical film. The resin composition may be one (coating material) further containing a solvent.

The zirconium oxide nanoparticles exhibit excellent dispersibility particularly in a solvent having high polarity. Therefore, the solvent used for the composition (e.g., the dispersion liquid and the resin composition) has an HSP distance to water of preferably 40 $(MPa)^{1/2}$ or less, more preferably 35 $(B/Pa)^{1/2}$ or less, further preferably 30 $(MPa)^{1/2}$ or less A lower limit is not particularly set but is usually 0 $(MPa)^{1/2}$ or more.

Examples of the organic solvent in which the zirconium oxide nanoparticles can be dispersed are alcohols such as methanol, ethanol, n-propanol, isopropanol, and ethylene glycol; ketones such as methyl ethyl ketone, methyl isobutyl ketone, and cyclohexanone; esters such as ethyl acetate and propyl acetate; ethers such as ethylene glycol monomethyl ether and diethylene glycol monobutyl ether; modified ethers such as propylene glycol monomethyl ether acetate; hydrocarbons such as benzene, toluene, xylene, ethylbenzene, hexane, cyclohexane, methylcyclohexane, ethylcyclohexane, and mineral spirit; halogenated hydrocarbons such as dichloromethane and chloroform; amides such as dimethylformamide, N,N-dimethylacetamide, and N-methylpyrrolidone; water; and oils such as mineral oil, plant oil, wax oil, and silicone oil. These may be used alone or in combination of two or more.

The zirconium oxide nanoparticles have good dispersibility particularly in a polar solvent. Therefore, preferable organic solvents are water, alcohols, esters, or amides, more preferable are water, alcohols, or esters, further preferable are water or alcohols, particularly preferable are water, methanol, or ethanol.

The zirconium oxide nanoparticles according to the present invention have good dispersibility in the organic solvent, so that it is possible to produce a dispersion liquid having a high core concentration. In the dispersion liquid, a total amount (core concentration) of oxide of the metal element (e.g., zirconium, aluminum, and a transition metal) contained in the nanoparticles according to the present invention is preferably 45% by mass or more, more preferably 50% by mass or more, further preferably 53% by mass or more in 100 mass of the dispersion liquid. An upper limit is not set but is, for example, 80% by mass or less, more preferably 70% by mass or less. An increase in proportion of a metal component contained in the dispersion liquid makes properties of the metal component more likely to appear, so that it is possible to simply produce a product having a high refractive index.

In the dispersion liquid, the total amount (core concentration) of oxide of the metal element (e.g., zirconium, aluminum, and a transition metal) contained in the nanoparticles according to the present invention can be calculated on the basis of formula (A).

Core concentration=total weight of metal oxide contained in nanoparticles according to the present invention in dispersion liquid/weight of dispersion liquid (A)

The monofunctional monomer may be any compound that has only one polymerizable carbon-carbon double bond, and examples include (meth)acrylate esters; styrene monomers such as styrene, p-tert-butylstyrene, a-methylstyrene, m-methylstyrene, p-methylstyrene, p-chlorostyrene, and p-chloromethylstyrene; carboxyl group-containing monomers such as (meth)acrylic acid; and hydroxy group-containing monomers such as hydroxyethyl (meth)acrylate. Specific examples of the (meth)acrylate esters include alkyl (meth)acrylate esters such as methyl (meth)acrylate, ethyl (meth)acrylate, n-propyl (meth)acrylate, n-butyl (meth)acrylate, isobutyl (meth)acrylate, tert-butyl (meth)acrylate, 2-ethylhexyl (meth)acrylate, and lauryl (meth)acrylate; cycloalkyl (meth)acrylate esters such as cyclohexyl (meth)acrylate and isobornyl (meth)acrylate; aralkyl (meth)acrylate esters such as benzyl (meth)acrylate; and glycidyl group-containing (meth)acrylate esters such as glycidyl (meth)acrylate. These exemplified monofunctional monomers may be used alone, or two or more may be appropriately mixed for use.

The crosslinkable monomer may be any compound having a plurality of carbon-carbon double bonds copolymerizable with a carbon-carbon double bond of a monomer. Specific examples of the crosslinkable monomer include polyfunctional (meth)acrylates such as alkylene glycol poly(meth)acrylates (e.g., ethylene glycol di(meth)acrylate, diethylene glycol di(meth)acrylate, propylene glycol di(meth)acrylate, and dipropylene glycol di(meth)acrylate), neopentyl glycol poly(meth)acrylates (e.g., neopentyl glycol di(meth)acrylate and dineopentyl glycol di(meth)acrylate), trimethylolpropane poly(meth)acrylates (e.g., trimethylolpropane tri(meth)acrylate and ditrimethylolpropane tetra(meth)acrylate), and pentaerythritol poly(meth)acrylates (e.g., pentaerythritol tri(meth)acrylate, pentaerythritol tetra(meth)acrylate, and dipentaerythritol hexa(meth)acrylate; polyfunctional styrene monomers such as divinylbenzene; and polyfunctional allyl ester monomers such as diallyl phthalate, diallyl isophthalate, triallyl cyanurate, and triallyl isocyanurate.

The composition containing the above-mentioned monomer corresponds to a curable composition. The curable composition constitutes a resin composition after curing and the resin composition according to the present invention also includes such a curable composition. The composition according to the present invention may also be a resin composition containing the above-mentioned polymer (resin). For constituting the resin composition, examples of the polymer as a medium include polyamides such as 6-nylon, 66-nylon, and 12-nylon; polyimides; polyurethanes; polyolefins such as polyethylene and polypropylene; polyesters such as PET, PBT, and PEN; polyvinyl chlorides; polyvinylidene chlorides; polyvinyl acetates; polyvinyl alcohols; polystyrenes; a (meth)acrylic resin polymer; an ABS resin; a fluororesin; phenol resins such as a phenol-formalin resin and a cresol-formalin resin; an epoxy resin; amino resins such as an urea resin, a melamine resin, and a guanamine resin; and soft resins and hard resins such as a polyvinyl butyral resin, a polyurethane resin, an ethylene-vinyl acetate copolymer resin, and an ethylene-(meth)acrylate ester copolymer resin. Among the examples described above, more preferred are polyimides, polyurethanes, polyesters, polyvinyl alcohols, a (meth)acrylic resin polymer, phenol resins, amino resins, and an epoxy resin, and further preferred are polyvinyl alcohols or a (meth)acrylic resin polymer. These may be used alone, or two or more may be mixed for use.

Concentration of the zirconium oxide nanoparticles in the composition can be appropriately set according to a purpose of use. In cases where the composition is uncured or contains the polymer (resin), however, the concentration of the zirconium oxide nanoparticles is usually 90% by mass or less relative to 100% by mass of entire components of the composition (total of all the components used among the zirconium oxide nanoparticles, the solvent, the monomer, the oligomer, the polymer, and a polymer precursor described later). With the concentration being more than 90% by mass, the zirconium oxide nanoparticles are less likely to be uniformly dispersed to possibly give a cloudy uncured composition. On the other hand, a lower limit is not particularly set but is, for example, 1% by mass or more in consideration of solvent costs. The concentration is more preferably 5% by mass or more and 85% by mass or less, further preferably 10% by mass or more and 80% by mass or less.

The zirconium oxide nanoparticles have remarkably excellent dispersibility to give a composition (dispersion), even with a high concentration, that has good transparency. The composition having therein the zirconium oxide nanoparticles dispersed at a high concentration is advantageous, for example, to improve a refractive index, enabling adjustment of the refractive index for various purposes of use. In use of a zirconium oxide nanoparticle composition having a high concentration, an amount of the zirconium oxide nanoparticles in the composition is preferably 25% by mass or more, more preferably 30% by mass or more, further preferably 60% by mass or more. An upper limit of the amount of the zirconium oxide nanoparticles in the composition is not particularly set but may be 90% by mass or less.

In the resin composition (including the curable composition after curing), an additive component other than the zirconium oxide nanoparticles and the resin may be blended. Examples of such an additive component include a curing agent, a curing accelerator, a colorant, a mold release agent, a reactive diluent, a plasticizer, a stabilizer, a flame retardant auxiliary, and a crosslinking agent.

A shape of the resin composition (including the curable composition after curing) is not particularly limited and may be, for example, a molded material such as a plate, a sheet, a film, or a fiber.

The zirconium oxide nanoparticles are suitably used, due to their good dispersibility, for optical films (or sheets) such as an antireflection film, a hard coat film, a luminance improvement film, a prism film, a lenticular sheet, and a microlens sheet, an optical refractive index regulating agent, an optical adhesive agent, a light waveguide, a lens, a catalyst, a CMP polishing composition, an electrode, a capacitor, an ink-jet recording method, a piezoelectric element, light extraction improvers such as an LED, OLED, and organic EL, etc., an antibacterial agent, a dental adhesive agent, and a light condensing structure used in a solar panel. The zirconium oxide nanoparticles can also be suitably used for a purpose of use of ceramic materials such as an artificial tooth material, an SOFC (solid oxide fuel cell) material, and a crucible owing to their suppression of change in crystal structures before and after firing along with good dispersibility.

The zirconium oxide nanoparticles are coated with the compound (1) having the group $R^1$, so that they have good dispersibility in a solvent (particularly a solvent having high polarity), and a ceramic material obtained by firing the composition containing the zirconium oxide nanoparticles has good ceramic characteristics such as translucency, toughness, and strength.

The ceramic material obtained from the zirconium oxide nanoparticles can be obtained by firing the zirconium oxide nanoparticles alone The ceramic material can also be obtained by firing a composition containing, in addition to the zirconium oxide nanoparticles, an additive such as alumina, spinel, YAG, mullite, or an aluminum borate compound. Further, the ceramic material can also be obtained by firing a composition containing the zirconium oxide nanoparticles and a binder. Firing temperature at this time may be set to about 500 to 1600° C. The firing can be performed by a method known in the art. Pressure may be applied to accelerate sintering during the firing. The firing may be performed in air, in an oxygen atmosphere, in a mixed atmosphere of oxygen with air and may also be performed in an inert (e.g., nitrogen or argon) atmosphere. It is possible to appropriately select a condition according to a purpose of use after firing.

The present application claims priority based on Japanese Patent Application No. 2016-061941 filed on Mar. 25, 2016 and Japanese Patent Application No. 2016-141696 filed on Jul. 19, 2016. All the contents described in Japanese Patent Application No. 2016-061941 filed on Mar. 25, 2016 and Japanese Patent Application No. 2016-141696 filed on Jul. 19, 2016 are incorporated herein by reference.

EXAMPLES

Hereinafter, the present invention is more specifically described with reference to examples. The present invention, however, is not limited by the following examples but can also be absolutely carried out with appropriate changes to the examples within a scope in compliance with the intent described above and later, and all the changes are to be encompassed within a technical scope of the present invention.

Physical properties and characteristics that are disclosed in the examples were measured by following methods.

(1) Analysis of crystal structure

Crystal structures of zirconium oxide nanoparticles were analyzed using an X-ray diffractometer (RINT-TTRIII manufactured by Rigaku Corporation). Measurement conditions are as follows.

X-ray source: CuKα (0.154 nm)
X-ray output setting: 50 kV, 300 mA
Sampling width: 0.0200°
Scanning speed: 10.0000°/min
Measurement range: 10 to 75°
Measurement temperature: 25° C.

(2) Quantitative Determination of Ratio of Tetragonal Crystal and Monoclinic Crystal On the basis of a value calculated using the X-ray diffractometer (RINT-TTRIII manufactured by Rigaku Corporation), a tetragonal crystal and a monoclinic crystal were quantitatively determined by reference intensity ratio method (RIP method) using computational software (PDXL manufactured by Rigaku Corporation) (Peaks were assigned according to directions of the computational software).

(3) Calculation of Crystallite Diameter by X-Ray Diffraction Analysis

A crystallite diameter of zirconium oxide nanoparticles was calculated using the computational software (PDXL manufactured by Rigaku Corporation) on the basis of width at half maximum of a peak at 30° that is analyzed and calculated by the X-ray diffractometer (RINT-TTRIII manufactured by Rigaku Corporation).

In the X-ray diffraction measurement, it is difficult to distinguish a cubic crystal of zirconium oxide nanoparticles from the tetragonal crystal. Therefore, even with the cubic crystal present in the nanoparticles, ratio of the cubic crystal is counted as ratio of the tetragonal crystal.

(4) Measurement of Weight (Mass) Decrease Rate

Zirconium oxide nanoparticles were heated from room temperature to 800° C. at 10° C./min in an air atmosphere, and a weight (mass) decrease rate of the particles was measured by TG-DTA (thermogravimetric-differential thermal analysis) apparatus. This weight (mass) decrease rate can provide a ratio of a coating agent that coats the zirconium oxide nanoparticles.

(5) Measurement of Average Primary Particle Diameter with Electron Microscope

An average primary particle diameter of coated type zirconium oxide particles was measured by observing the nanoparticles with an ultra-high resolution field-emission scanning electron microscope (S-4800 manufactured by Hitachi High-Technologies Corporation). Being observed at 150000-fold magnification, any 100 particles of the coated type zirconium oxide particles was measured for length along a major axis of the particles, and an average value of the length was defined as the average primary particle diameter.

(6) Calculation of Core Concentration

Core concentration was calculated on the basis of a formula (A). In the examples, "total weight of a metal oxide contained in nanoparticles in a dispersion liquid" is calculated as "(weight of nanoparticles blended×(1−weight decrease rate measured in (4)))."

Core concentration=total weight of metal oxide contained in nanoparticles in dispersion liquid/ weight of dispersion liquid  (A)

Comparative Example 1

Production of Zirconium Oxide Nanoparticles Coated with 2-Ethylhexanoic Acid ($R^1$ has a Hansen Solubility Parameter (HSP) Distance to Ethanol of 21 $(MPa)^{1/2}$) and/or A Carboxylate Derived from 2-Ethylhexanoic Acid A mineral spirit solution of zirconium 2-ethylhexanoate (90.4 g, content rate of zirconium 2-ethylhexanoate: 44% by mass, manufactured by Daiichi Kigenso Kagaku Kogyo Co., Ltd.) was mixed with pure water (15.5 g) and charged into a 200-mL hydrothermal synthesis vessel. This vessel was heated to 190° C. and kept at the same temperature for 16 hours for reaction. Pressure during hydrothermal synthesis was 1.3 MPaG (gauge pressure). After the reaction, water was removed through separation from the hydrothermal synthesis reaction solution.

An upper layer of the hydrothermal synthesis reaction liquid from which water had been removed was heated at 180° C. to remove the organic solvent and thus give zirconium oxide nanoparticles whose crystal structures were confirmed. In the confirmation, diffraction lines attributed to a tetragonal crystal and a monoclinic crystal were detected, intensity of which provided a ratio between the tetragonal crystal and the monoclinic crystal of 74/26, and the particle diameter (crystallite diameter of the tetragonal crystal and/or a cubic crystal) was 5 nm. The average primary particle diameter was measured with the electron microscope to be 11 nm. The weight (mass) decrease rate of the zirconium oxide nanoparticles was 14% by mass. Accordingly, the coating 2-ethylhexanoic acid and/or carboxylate derived from 2-ethylhexanoic acid was determined to be 14% by mass of the entire zirconium oxide nanoparticles.

Ethanol (0.5 g, Hansen solubility parameter (HSP) distance to water: 24 $(MPa)^{1/2}$) was added to these particles (1 g) obtained by removing the organic solvent, but the mixture became cloudy and the particles were not capable of being dispersed in the mixture.

Example 1

Production of Zirconium Oxide Nanoparticles Coated with Methoxyacetic Acid

The upper layer (50 g) of the hydrothermal synthesis reaction liquid of Comparative Example 1 from which water had been removed was mixed under stirring with 5 g of methoxyacetic acid ($R^1$ has a Hansen solubility parameter (HSP) distance to ethanol of 14 $(MPa)^{1/2}$) at 60° C. for 30 minutes. Next, n-hexane was added and then aggregation particles were separated through filtration. Subsequently, the separated aggregation particles were added to n-hexane and stirred for 10 minutes and then the aggregation particles were separated through filtration. The resultant particles were vacuum-dried at room temperature to give zirconium oxide nanoparticles coated with methoxyacetic acid.

In confirmation of the crystal structures of these particles, diffraction lines attributed to a tetragonal crystal and a monoclinic crystal were detected, intensity of which provided a ratio between the tetragonal crystal and the monoclinic crystal as 74/26, and the particle diameter (crystallite diameter of the tetragonal crystal and/or a cubic crystal) was 5 nm. The weight (mass) decrease rate of the zirconium oxide nanoparticles was 11% by mass. Accordingly, the mass of the coating 2-ethylhexanoic acid, carboxylate derived from 2-ethylhexanoic acid, and methoxyacetic acid was determined to be 11% by mass of the entire zirconium oxide nanoparticles.

Example 2

Production of Inorganic Oxide Fine Particle-Containing Solution 1

The zirconium oxide nanoparticles (1 g) obtained in Example 1 was blended with ethanol (0.5 g) and stirred until the mixture became uniform, to give an inorganic oxide fine particle-containing solution 1. In the dispersion liquid, the concentration (core concentration) of the metal oxide contained in the resultant nanoparticles was 59% (=(1 g×(1−0.11))/(1 g+0.5 g)).

Comparative Example 2

Production of Yttria-Stabilized Zirconium Oxide Nanoparticles Coated with 2-Ethylhexanoic Add and/or Carboxylate Derived from 2-Ethylhexanoic Acid Nanoparticles were synthesized in the same manner as in Example 1 except for changing to 86.7 g the amount of the mineral spirit solution of zirconium 2-ethylhexanoate (content rate of zirconium 2-ethylhexanoate: 44% by mass, manufactured by Daiichi Kigenso Kagaku Kogyo Co., Ltd.) in Example 1 and using 10.1 g the amount of NIKKA OCTHIX YTTRIUM (content of yttrium: 6.2%, manufactured by Nihon Kagaku Sangyo Co., Ltd.).

In confirmation of the crystal structures of the resultant yttria-stabilized zirconium oxide nanoparticles, diffraction lines attributed to a tetragonal crystal and a monoclinic crystal were detected, intensity of which provided a ratio between the tetragonal crystal and the monoclinic crystal of 97/3, and the particle diameter (crystallite diameter of the tetragonal crystal and/or a cubic crystal) was 4 nm. The average primary particle diameter was measured with the electron microscope to be 6 nm. The weight (mass) decrease rate of the yttria-stabilized zirconium oxide nanoparticles was 25% by mass. Accordingly, the coating 2-ethylhexanoic acid and/or carboxylate derived from 2-ethylhexanoic acid was determined to be 25% by mass of the entire yttria-stabilized zirconium oxide nanoparticles. Yttria-stabilized zirconium oxide nanoparticles (1 g) obtained by removing the organic solvent was mixed with ethanol (0.5 g) and stirred but the white powder was never dispersed.

Example 3

Production of Coated Type Yttria-Stabilized Zirconium Oxide Nanoparticles Coated with Methoxyacetic Acid Nanoparticles were synthesized in the same manner as in Example 1 except for using the upper layer synthesized in Comparative Example 2 as the upper layer of the hydrothermal synthesis reaction liquid from which used water had been removed. The weight (mass) decrease rate of the yttria-stabilized zirconium oxide nanoparticles was 15% by mass. Accordingly, the mass of the coating 2-ethylhexanoic acid, carboxylate derived from 2-ethylhexanoic acid, and methoxyacetic acid was determined to be 15% by mass of the entire yttria-stabilized zirconium oxide nanoparticles.

Example 4

Production of Inorganic Oxide Fine Particle-Containing Solution 2

The yttria-stabilized zirconium oxide nanoparticles (1 g) obtained in Example 3 was blended with ethanol (0.5 g) and stirred until the mixture became uniform, to give an inorganic oxide fine particle-containing solution 2. In the dispersion liquid, the concentration (core concentration) of the metal oxide contained in the resultant nanoparticles was 57% (=(1 g×(1−0.15))/(1 g+0.5 g)).

Example 5

Production of Inorganic Oxide Fine Particle-Containing Resin Composition 1

The zirconium oxide nanoparticles (1 g) obtained in Example 1 were blended with 1 g of 2-hydroxyethyl acrylate (manufactured by NIPPON SHOKUBAI CO., LTD.) and 4 g of methanol and stirred at room temperature for 1 hour to give a uniform inorganic oxide fine particle-containing resin composition 1.

Example 6

Production of Inorganic Oxide Fine Particle-Containing Resin Composition 2

The zirconium oxide nanoparticles (1 g) obtained in Example 1 were blended with 1 g of pentaerythritol triacrylate (manufactured by SARTOMER JAPAN INC. "SR444 NS") and 4 g of methanol and stirred at room temperature for 1 hour to give a uniform inorganic oxide fine particle-containing resin composition 2.

Example 7

Production of Inorganic Oxide Fine Particle-Containing Resin Composition 3

The zirconium oxide nanoparticles (1 g) obtained in Example 1 were blended with 1 g of dipentaerythritol hexaacrylate (manufactured by Nippon Kayaku Co., Ltd. "KAYARAD DPHA") and 4 g of methanol and heated and stirred at 80° C. for 1 hour to give a uniform inorganic oxide fine particle-containing resin composition 3.

Example 8

Production of Inorganic Oxide Fine Particle-Containing Resin Composition 4

The zirconium oxide nanoparticles (1 g) obtained in Example 1 were blended with 1 g of polyvinyl alcohol (manufactured by KURARAY CO., LTD. "CP-1210") and 4 g of ion-exchanged water and heated and stirred at 80° C. for 1 hour to give a uniform inorganic oxide fine particle-containing resin composition 4.

INDUSTRIAL APPLICABILITY

Zirconium oxide nanoparticles according to the present invention has excellent dispersibility in a polar solvent such as alcohol and are capable of increasing a core concentration in a dispersion liquid. The zirconium oxide nanoparticles are useful because they can be widely used for, for example, optical materials and electronic component materials.

The invention claimed is:
1. Zirconium oxide nanoparticles coated with a secondary carboxylic acid and at least one compound selected from the group consisting of $R^1$—COOH, $(R^1O)_{3-n}$—P(O)—$(OH)_n$, $(R^1)_{3-n}$—P(O)—$(OH)_n$, $(R^1O)$—S(O)(O)—(OH), $R^1$—S(O)(O)—(OH), and $(R^1)_{4-m}$—Si$(R^4)_m$,
wherein $R^1$ represents a group comprising a carbon atom and at least one element selected from the group consisting of an oxygen atom, a nitrogen atom, and a sulfur atom, and having the total number of carbon atoms, oxygen atoms, nitrogen atoms, and sulfur atoms of 4 or less;
$R^4$ represents a halogen atom or —$OR^2$, and $R^2$ represents a hydrogen atom or an alkyl group;
n represents 1 or 2, and m represents an integer of 1 to 3; and
the secondary carboxylic acid has 4 or more carbon atoms.
2. The zirconium oxide nanoparticles according to claim 1, wherein $R^1$ has a ratio of a sum of the number of oxygen atoms, nitrogen atoms, and sulfur atoms to the number of carbon atoms (sum of the number of oxygen atoms, nitrogen atoms, and sulfur atoms/number of carbon atoms) of 1/7 or more and 1/1 or less.
3. The zirconium oxide nanoparticles according to claim 1, wherein the compound has a ratio of the number of oxygen atoms to the number of carbon atoms (number of oxygen atoms/number of carbon atoms) of more than 1/6 and 1/0.2 or less.
4. The zirconium oxide nanoparticles according to claim 1, wherein the zirconium oxide nanoparticles have a crystal structure, and a total of a tetragonal crystal and a cubic crystal is 60% or more of entire crystal structures.
5. The zirconium oxide nanoparticles according to claim 1, having an average particle diameter of 1 to 100 nm.
6. The zirconium oxide nanoparticles according to claim 1, wherein $R^1$ has a Hansen solubility parameter (HSP) distance to ethanol of 0 $(MPa)^{1/2}$ or more and 20 $(MPa)^{1/2}$ or less.
7. The zirconium oxide nanoparticles according to claim 1, wherein $R^1$ has a Hansen solubility parameter (HSP) distance to water of 20 $(MPa)^{1/2}$ or more and 41 $(MPa)^{1/2}$ or less.
8. The zirconium oxide nanoparticles according to claim 1, wherein the secondary carboxylic acid is at least one selected from the group consisting of isobutyric acid, 2-methylbutyric acid, 2-ethylbutyric acid, 2-ethylhexanoic acid, 2-methylvaleric acid, 2-methylhexanoic acid, 2-methylheptanoic acid, 2-propylbutyric acid, 2-hexylvaleric acid, 2-hexyldecanoic acid, 2-heptylundecanoic acid, 2-methylhexadecanoic acid, and 4-methylcyclohexanecarboxylic acid.
9. A dispersion liquid comprising the zirconium oxide nanoparticles according to claim 1.
10. The dispersion liquid according to claim 9, comprising a solvent having a Hansen solubility parameter (HSP) distance to water of 0 $(MPa)^{1/2}$ or more and 40 $(MPa)^{1/2}$ or less.
11. A resin composition comprising the zirconium oxide nanoparticles according to claim 1.
12. The resin composition according to claim 11, comprising at least one resin component selected from a monomer, an oligomer, and a polymer.
13. The resin composition according to claim 11, comprising a solvent having a Hansen solubility parameter (HSP) distance to water of 0 $(MPa)^{1/2}$ or more and 40 $(MPa)^{1/2}$ or less.
14. A molded material comprising the zirconium oxide nanoparticles according to claim 1.
15. A ceramic material comprising the zirconium oxide nanoparticles according to claim 1.
16. A process for producing a ceramic material, comprising firing the zirconium oxide nanoparticles according to claim 1 at 500° C. or higher.
17. A process for producing a ceramic material, comprising firing a composition comprising the zirconium oxide nanoparticles according to claim 1 at 500° C. or higher.

* * * * *